US009352301B2

(12) United States Patent
Ito et al.

(10) Patent No.: US 9,352,301 B2
(45) Date of Patent: May 31, 2016

(54) EXHAUST GAS PURIFICATION CATALYST, EXHAUST GAS PURIFICATION MONOLITH CATALYST, AND METHOD FOR PRODUCING EXHAUST GAS PURIFICATION CATALYST

(71) Applicant: NISSAN MOTOR CO., LTD., Yokohama-shi, Kanagawa (JP)

(72) Inventors: Junji Ito, Yokohama (JP); Yasunari Hanaki, Yokohama (JP); Tetsuro Naito, Yokohama (JP); Misaki Akaishi, Yokosuka (JP); Hironori Wakamatsu, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/425,237

(22) PCT Filed: Jul. 18, 2013

(86) PCT No.: PCT/JP2013/069462
§ 371 (c)(1),
(2) Date: Mar. 2, 2015

(87) PCT Pub. No.: WO2014/038294
PCT Pub. Date: Mar. 13, 2014

(65) Prior Publication Data
US 2015/0217275 A1    Aug. 6, 2015

(30) Foreign Application Priority Data

Sep. 10, 2012  (JP) .................. 2012-198857

(51) Int. Cl.
*B01J 23/00* (2006.01)
*B01J 23/02* (2006.01)
(Continued)

(52) U.S. Cl.
CPC .................. *B01J 23/44* (2013.01); *B01D 53/94* (2013.01); *B01D 53/9413* (2013.01);
(Continued)

(58) Field of Classification Search
CPC .......... B01J 21/066; B01J 23/10; B01J 23/58; B01J 23/63; B01J 23/64; B01J 23/78; B01J 23/83; B01J 23/84; B01J 23/89; B01J 23/8906; B01J 23/8913; B01J 23/892; B01J 23/894; B01J 23/8946; B01J 23/8986; B01J 37/02
USPC ......... 502/302–304, 324, 326, 328, 332–339, 502/439, 349
See application file for complete search history.

(56) References Cited

U.S. PATENT DOCUMENTS

| 5,089,454 A | 2/1992 | Lerot et al. |
| 5,243,103 A | 9/1993 | Lerot et al. |

(Continued)

FOREIGN PATENT DOCUMENTS

| CN | 1171063 A | 1/1998 |
| CN | 102076412 A | 5/2011 |

(Continued)

OTHER PUBLICATIONS

Chinese Office Action, Jul. 31, 2014, 6 pages.
(Continued)

*Primary Examiner* — Cam N. Nguyen
(74) *Attorney, Agent, or Firm* — Foley & Lardner LLP

(57) ABSTRACT

An exhaust gas purification catalyst contains a first catalyst in which an oxide of general formula (1): $La_xM_{1-x}M'O_{3-\delta}$ (where La is lanthanum, M is at least one selected from a group consisting of barium (Ba), strontium (Sr) and calcium (Ca), M' is at least one selected from a group consisting of iron (Fe), cobalt (Co), nickel (Ni) and manganese (Mn), $\delta$ is the amount of oxygen defect, and x and $\delta$ satisfy $0<x\leq1$ and $0\leq\delta\leq1$) is supported by an oxide capable of occluding and releasing oxygen, and a second catalyst containing a noble metal. The particle size of the oxide capable of occluding and releasing oxygen is within the range from 1 to 50 nm. The particle size of the oxide of the general formula (1) is within the range from 1 to 30 nm.

12 Claims, 12 Drawing Sheets

(51) Int. Cl.
| | |
|---|---|
| *B01J 23/10* | (2006.01) |
| *B01J 23/32* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01J 23/70* | (2006.01) |
| *B01J 23/74* | (2006.01) |
| *B01J 21/04* | (2006.01) |
| *B01D 53/94* | (2006.01) |
| *B01J 37/02* | (2006.01) |
| *B01J 37/04* | (2006.01) |
| *B01J 35/00* | (2006.01) |
| *B01J 21/06* | (2006.01) |
| *B01J 23/745* | (2006.01) |
| *B01J 23/83* | (2006.01) |
| *B01J 23/89* | (2006.01) |
| *B01J 23/34* | (2006.01) |
| *B01J 35/04* | (2006.01) |
| *B01J 37/08* | (2006.01) |

(52) U.S. Cl.
CPC ............ *B01J 21/066* (2013.01); *B01J 23/005* (2013.01); *B01J 23/10* (2013.01); *B01J 23/34* (2013.01); *B01J 23/42* (2013.01); *B01J 23/745* (2013.01); *B01J 23/83* (2013.01); *B01J 23/89* (2013.01); *B01J 23/894* (2013.01); *B01J 23/8946* (2013.01); *B01J 35/002* (2013.01); *B01J 35/006* (2013.01); *B01J 35/0006* (2013.01); *B01J 35/0013* (2013.01); *B01J 35/04* (2013.01); *B01J 37/02* (2013.01); *B01J 37/0209* (2013.01); *B01J 37/0244* (2013.01); *B01J 37/04* (2013.01); *B01J 37/08* (2013.01); *B01D 2255/204* (2013.01); *B01D 2255/2042* (2013.01); *B01D 2255/2045* (2013.01); *B01D 2255/2063* (2013.01); *B01D 2255/2065* (2013.01); *B01D 2255/2073* (2013.01); *B01D 2255/20715* (2013.01); *B01D 2255/20738* (2013.01); *B01D 2255/20746* (2013.01); *B01D 2255/20753* (2013.01); *B01D 2255/402* (2013.01); *B01D 2255/908* (2013.01); *B01D 2255/9202* (2013.01); *B01J 37/0203* (2013.01); *B01J 2523/00* (2013.01)

(56) References Cited

U.S. PATENT DOCUMENTS

| | | | | |
|---|---|---|---|---|
| 5,895,772 | A | | 4/1999 | Grigorova et al. |
| 5,939,354 | A | * | 8/1999 | Golden ................ B01D 53/945 502/302 |
| 5,977,017 | A | * | 11/1999 | Golden ................ B01D 53/945 502/302 |
| 6,352,955 | B1 | * | 3/2002 | Golden ................ B01D 53/945 423/263 |
| 6,531,425 | B2 | * | 3/2003 | Golden ................ B01D 53/945 502/302 |
| 7,014,825 | B2 | * | 3/2006 | Golden ................ B01D 53/944 423/213.2 |
| 7,514,055 | B2 | * | 4/2009 | Golden ................ B01D 53/944 423/213.2 |
| 8,455,390 | B2 | | 6/2013 | Kikuchi et al. |
| 8,999,878 | B2 | * | 4/2015 | Takeshima .......... B01D 53/945 502/100 |
| 9,101,914 | B2 | | 8/2015 | Ito et al. |
| 2007/0135300 | A1 | | 6/2007 | Kagami et al. |
| 2009/0099012 | A1 | | 4/2009 | Suzuki et al. |
| 2010/0233045 | A1 | | 9/2010 | Kim et al. |
| 2012/0046163 | A1 | | 2/2012 | Ifrah et al. |
| 2012/0055142 | A1 | | 3/2012 | Hilgendorff |
| 2014/0018235 | A1 | | 1/2014 | Ito et al. |

FOREIGN PATENT DOCUMENTS

| | | |
|---|---|---|
| EP | 0 525 677 A1 | 2/1993 |
| EP | 2 308 595 A1 | 4/2011 |
| EP | 2 692 432 A1 | 2/2014 |
| JP | 62-221448 A | 9/1987 |
| JP | 02-017944 A | 1/1990 |
| JP | 5-31367 A | 2/1993 |
| JP | 07-136518 A | 5/1995 |
| JP | 9-253453 A | 9/1997 |
| JP | 2000-51700 A | 2/2000 |
| JP | 2001-276626 A | 10/2001 |
| JP | 2004-181435 A | 7/2004 |
| JP | 2005-306618 A | 11/2005 |
| JP | 2006-256911 A | 9/2006 |
| JP | 2006-320797 A | 11/2006 |
| JP | 2007-313500 A | 12/2007 |
| JP | 2008-150264 A | 7/2008 |
| JP | 2009-090237 A | 4/2009 |
| JP | 2009-131774 A | 6/2009 |
| JP | 2012-519071 A | 8/2012 |
| WO | WO-96/14153 A1 | 5/1996 |
| WO | WO-02/49963 A1 | 6/2002 |
| WO | WO-2010/100067 A1 | 9/2010 |
| WO | WO 2012/133526 A1 | 10/2012 |

OTHER PUBLICATIONS

Claude Descorme et al., Oxygen Storage Capacity Measurements of Three-Way Catalysts Under Transient Conditions, Applied Catalysis A: General 223, 2002, pp. 287-299.
E. Tzimpilis et al., Preparation, Active Phase Composition and Pd Content of Perovskite-Type Oxides, Applied Catalysis B: Environmental, vol. 84, No. 3-4 2008, pp. 607-615.
European Search Report, Sep. 30, 2014, 5 pages.
Japanese Office Action, Oct. 3, 2014, 6 pages.
Japanese Office Action, Jul. 16, 2014, 6 pages.

* cited by examiner

EXHAUST GAS PURIFICATION CATALYST, EXHAUST GAS PURIFICATION MONOLITH CATALYST, AND METHOD FOR PRODUCING EXHAUST GAS PURIFICATION CATALYST

TECHNICAL FIELD

The present invention relates to an exhaust gas purification catalyst, an exhaust gas purification monolith catalyst, and a method for producing an exhaust gas purification catalyst. In more detail, the present invention relates to an exhaust gas purification catalyst and an exhaust gas purification monolith catalyst that exhibit high $NO_X$ conversion performance in a high temperature range and also exhibit high low-temperature activity in purification of exhaust gas components, and to a method for producing the exhaust gas purification catalyst.

BACKGROUND ART

Research and development have been conventionally conducted on purification catalysts that do not require a noble metal as an essential component. As for exhaust gas purification catalysts, a catalyst using a perovskite composite oxide has been proposed in which the transition metal element that constitutes the composite oxide phase along with a rare earth element is partly substituted with zirconium or the like (see Patent Document 1).

Further, a catalyst containing a low-temperature oxygen occluding/releasing material and an oxygen transferring material has been proposed as a PM oxidation catalyst or an exhaust gas purification catalyst that has good oxygen occluding and releasing property at a low temperature and good sustainability of the oxygen occluding and releasing property, in which the low-temperature oxygen occluding/releasing material is made of a composite oxide with a perovskite structure and has good oxygen occluding and releasing property at a low temperature, and the oxygen transferring material is made of a composite oxide with a perovskite structure and has good oxygen transferring property (see Patent Document 2).

CITATION LIST

Patent Literature

Japanese Patent Unexamined Publication No. 2005-306618
Japanese Patent Unexamined Publication No. 2009-131774

SUMMARY OF INVENTION

Technical Problem

However, a problem with the exhaust gas purification catalysts described in Patent Document 1 and Patent Document 2 is insufficient purification performance.

The present invention was made in consideration of the above problem with the prior art. It is therefore an object of the present invention to provide an exhaust gas purification catalyst and an exhaust gas purification monolith catalyst that exhibit high NOx conversion performance at a high temperature range and also exhibit high low-temperature activity, and a method for producing the exhaust gas purification catalyst.

Solution to Problem

The present inventors made a diligent study for achieving the above-described object. As a result, they found that the object can be achieved by a combination of a first catalyst in which an oxide of the general formula (1) having a predetermined particle size is supported by an oxide capable of occluding and releasing oxygen having a predetermined particle size and a second catalyst containing a noble metal. The present invention was thus completed.

$$La_xM_{1-x}M'O_{3-\delta} \qquad (1)$$

Where La is lanthanum, M is at least one selected from a group consisting of barium (Ba), strontium (Sr) and calcium (Ca), M' is at least one selected from a group consisting of iron (Fe), cobalt (Co), nickel (Ni) and manganese (Mn), δ is the amount of oxygen defect, and x and δ satisfy $0 < x \leq 1$ and $0 \leq \delta \leq 1$.

That is, the exhaust gas purification catalyst of the present invention contains the first catalyst in which the oxide of the general formula (1) having a particle size within the range from 1 to 30 nm is supported by the oxide capable of occluding and releasing oxygen having a particle size within the range from 1 to 50 nm, and the second catalyst containing a noble metal.

$$La_xM_{1-x}M'O_{3-\delta} \qquad (1)$$

Where La is lanthanum, M is at least one selected from a group consisting of barium (Ba), strontium (Sr) and calcium (Ca), M' is at least one selected from a group consisting of iron (Fe), cobalt (Co), nickel (Ni) and manganese (Mn), δ is the amount of oxygen defect, and x and δ satisfy $0 < x \leq 1$ and $0 \leq \delta \leq 1$.

Further, the exhaust gas purification monolith catalyst of the present invention includes a catalyst layer that contains the above-described exhaust gas purification catalyst of the present invention and is formed on an exhaust gas channel of a monolith support.

A first method for producing an exhaust gas purification catalyst of the present invention, which is a method for producing the above-described exhaust gas purification catalyst of the present invention, includes: allowing a first catalyst to support a second catalyst by immersing the first catalyst in a solution that contains a noble metal salt so as to impregnate the first catalyst with the noble metal salt and calcining, wherein the first catalyst is prepared by immersing an oxide capable of occluding and releasing oxygen in a solution that contains a lanthanum carboxylate and at least one metal carboxylate selected from a group consisting of a barium carboxylate, a strontium carboxylate, a calcium carboxylate, an iron carboxylate, a cobalt carboxylate, a nickel carboxylate and a manganese carboxylate and reducing a pressure of an atmosphere around the solution to a level lower than an atmospheric pressure so as to impregnate the oxide capable of occluding and releasing oxygen with the lanthanum carboxylate and the metal carboxylate and calcining.

A second method for producing an exhaust gas purification catalyst of the present invention, which is a method for producing the above-described exhaust gas purification catalyst of the present invention, includes: mixing a first catalyst with a second catalyst containing a noble metal salt, wherein the first catalyst is prepared by immersing an oxide capable of occluding and releasing oxygen in a solution that contains a lanthanum carboxylate and at least one metal carboxylate selected from a group consisting of a barium carboxylate, a strontium carboxylate, a calcium carboxylate, an iron carboxylate, a cobalt carboxylate, a nickel carboxylate and a manganese carboxylate and reducing a pressure of an atmosphere around the solution to a level lower than an atmospheric pressure so as to impregnate the oxide capable of occluding and releasing oxygen with the lanthanum carboxylate and the metal carboxylate and calcining.

Advantageous Effects of Invention

According to the present invention, the catalyst contains the first catalyst in which the oxide of the general formula (1) having a particle size within the range from 1 to 30 nm is supported by the oxide capable of occluding and releasing oxygen having a particle size within the range from 1 to 50 nm, and the second catalyst containing a noble metal.

Where La is lanthanum, M is at least one selected from a group consisting of barium (Ba), strontium (Sr) and calcium (Ca), M' is at least one selected from a group consisting of iron (Fe), cobalt (Co), nickel (Ni) and manganese (Mn), $\delta$ is the amount of oxygen defect, and x and $\delta$ satisfy $0<x\leq1$ and $0\leq\delta\leq1$.

Accordingly, it becomes possible to provide the exhaust gas purification catalyst and the exhaust gas purification monolith catalyst that exhibit high NOx conversion performance at a high temperature range and also exhibit high low-temperature activity, and the method for producing the exhaust gas purification catalyst.

DESCRIPTION OF EMBODIMENTS

Figure 1:
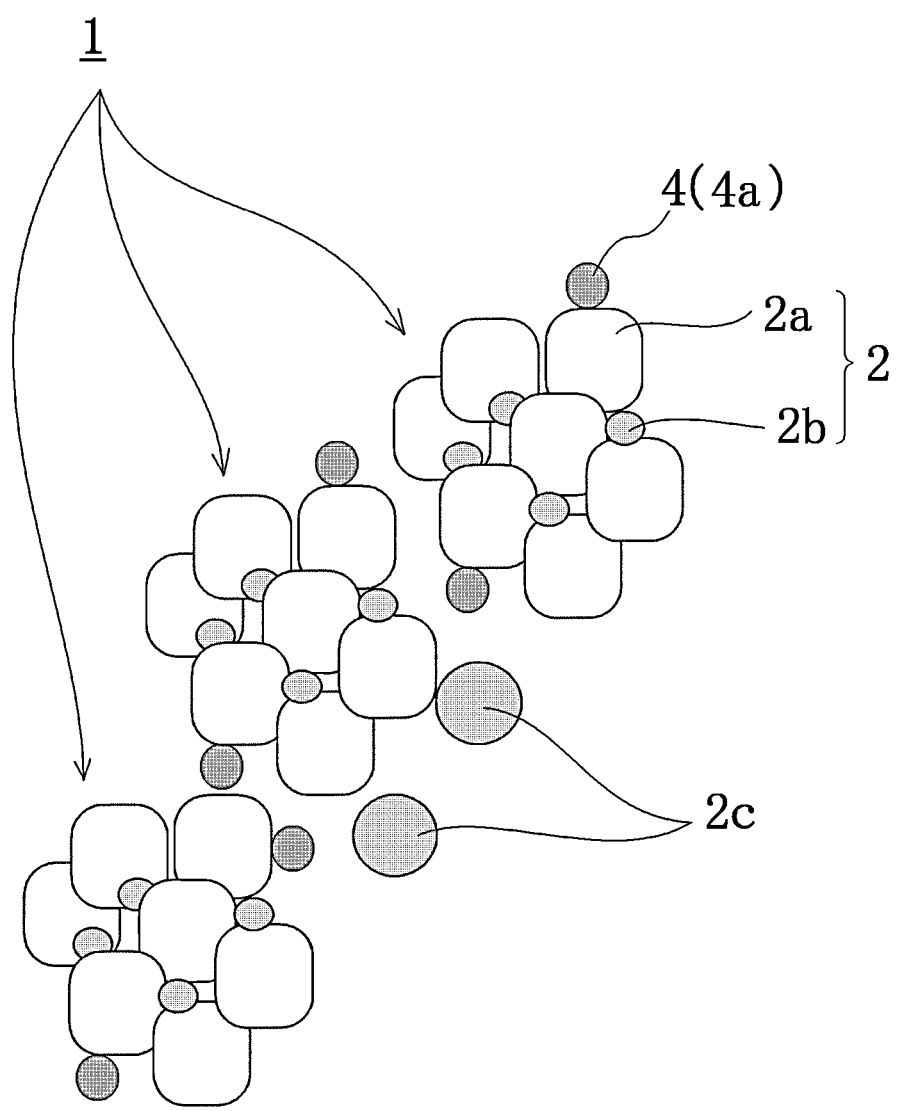
FIG. 1 schematically illustrates the structure of an exhaust gas purification catalyst according to a first embodiment.

Hereinafter, the exhaust gas purification catalyst, the exhaust gas purification monolith catalyst and the method for producing the exhaust gas purification catalyst will be described in detail.

First Embodiment

First, an exhaust gas purification catalyst according to an embodiment of the present invention will be described referring to the drawings. The dimension of the drawings referred to in the following embodiments is exaggerated for descriptive reasons, and may be different from the actual dimension.

FIG. 1 schematically illustrates the structure of an exhaust gas purification catalyst according to a first embodiment. As illustrated in the figure, in the exhaust gas purification catalyst 1 of the first embodiment, a second catalyst 4 containing a noble metal 4a is directly supported by a first catalyst 2 in which an oxide 2b of the following general formula (1) is supported by an oxide 2a capable of occluding and releasing oxygen. The particle size of the oxide 2a is within the range from 1 to 50 nm, and the particle size of the oxide 2b is within the range from 1 to 30 nm. An oxide 2c of the general formula (1), which is illustrated in FIG. 1 for reference, is not supported by the oxide 2a capable of occluding and releasing oxygen. The particle size of the oxide 2c is typically greater than 50 nm. While FIG. 1 illustrates an example where the noble metal is directly supported by the oxide capable of occluding and releasing oxygen, it should be understood that the present invention also encompasses the case where the noble metal is directly supported by the oxide of the general formula (1) (not shown).

Where La is lanthanum, M is at least one selected from a group consisting of barium (Ba), strontium (Sr) and calcium (Ca), M' is at least one selected from a group consisting of iron (Fe), cobalt (Co), nickel (Ni) and manganese (Mn), $\delta$ is the amount of oxygen defect, and x and $\delta$ satisfy $0<x\leq1$ and $0\leq\delta\leq1$.

As used in the present invention, the meaning of the phrase "an oxide of the general formula (1) having a particle size within the range from 1 to 30 nm is supported by an oxide capable of occluding and releasing oxygen having a particle size within the range from 1 to 50 nm" will be described in detail with an example "an oxide B is supported by an oxide A".

The oxide B is not supported by the oxide A when it is distinguishable from the oxide A as an aggregate under a transmission electron microscope (TEM). In contrast, the oxide B is supported by the oxide A when it is indistinguishable from the oxide A as an aggregation under a transmission electron microscope (TEM) and the constituent element thereof is detected along with the constituent element of the oxide A when the oxide A is subjected to an elemental analysis by means of an energy dispersive X-ray (EDX) analysis (measuring range: 5-nm beam diameter). However, it should be understood that the oxide B can be observed under a transmission electron microscope (TEM) at a higher magnification or by an X-ray photoelectron spectroscopic (XPS) analysis.

The exhaust gas purification catalyst with the above-described configuration exhibits high low-temperature activity. Further, the catalyst also exhibits high nitrogen oxides (NOx) conversion ratio at the high temperature range from 400° C. to 550° C.

So far it is presumed that the above functions and the advantageous effects are obtained based on the following reaction mechanism. However, it should be understood the present invention also encompasses the cases where the functions and the advantageous effects are obtained based on a different reaction mechanism.

In the exhaust gas purification catalyst, the oxide of the general formula (1) of the first catalyst, which is supported by the oxide capable of occluding and releasing oxygen, serves as an active site of the catalytic reaction along with the noble metal of the second catalyst. The oxide capable of occluding and releasing oxygen, which supports the oxide of the general formula (1), promotes the catalytic reaction by occluding and releasing oxygen required for the catalytic reaction. This improves the oxygen occluding and releasing performance, which leads to the high low-temperature activity.

Figure 2:
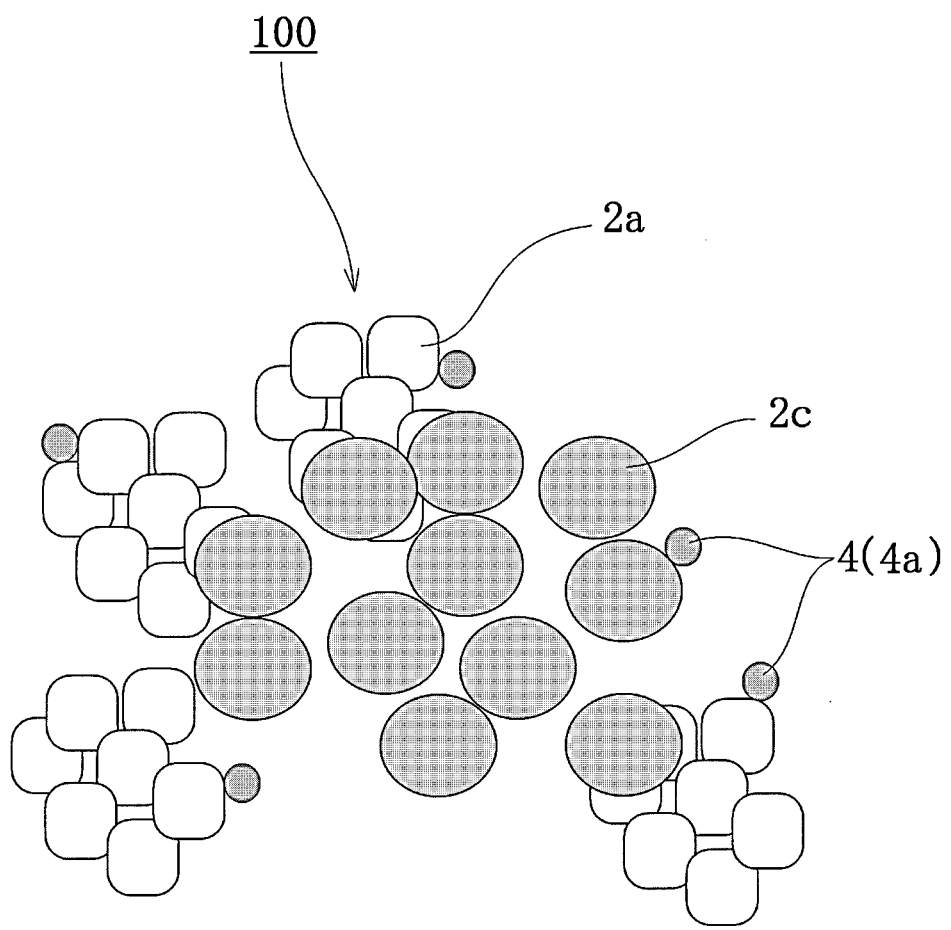
FIG. 2 schematically illustrates the structure of a conventional exhaust gas purification catalyst.

On the other hand, FIG. 2 schematically illustrates the structure of a conventional exhaust gas purification catalyst. As illustrated in the figure, the conventional exhaust gas purification catalyst 100 contains an oxide 2a capable of occluding and releasing oxygen, an oxide 2c of the following general formula (1) that is not supported by the oxide 2a but exists in an aggregated state, and a second catalyst 4 that contains a noble metal 4a and is supported by them. The particles of the oxide 2c are aggregated, and the particle size of the aggregates is typically within the range from 100 to 500 nm. It is presumed that the desired functions and advantageous effects are not obtained with this configuration because the above-described reaction mechanism is unlikely to occur.

It is required that the particle size of the oxide capable of occluding and releasing oxygen of the first catalyst is within the range from 1 to 50 nm, preferably within the range from 5 to 30 nm. If the particle size is less than 1 nm, the oxide capable of occluding and releasing oxygen may aggregate, and the desired functions and advantageous effects may not be obtained. If the particle size is greater than 50 nm, the oxide of the general formula (1) may not be supported, and the desired functions and the advantageous effects may not be obtained.

It is required that the particle size of the oxide of the general formula (1) of the first catalyst, which is supported by the oxide capable of occluding and releasing oxygen, is within the range from 1 to 30 nm, preferably within the range from 3 to 10 nm. If the particle size is less than 1 nm, the oxide capable of occluding and releasing oxygen may aggregate, and the desired functions and effects may not be obtained. If the particle size is greater than 30 nm, it may not be supported by the oxide capable of occluding and releasing oxygen, and the desired functions and the advantageous effects may not be obtained. It is particularly preferred that the particle size is equal to or less than 10 nm, since the catalyst exhibits further better purification performance.

As described above, it is presumed that the oxide of the general formula (1) serves as an active site of the catalytic reaction. To increase the number of active sites using the same amount of the oxide, it is preferred that the particle size of the oxide of the general formula (1) is smaller than the particle size of the oxide capable of occluding and releasing oxygen.

As used herein, the term "particle size" means the maximum distance between two points on the contour of an oxide particle (on an observation plane) that is observed under observation means such as a scanning electron microscope (SEM) and a transmission electron microscope (TEM).

The oxide capable of occluding and releasing oxygen of the first catalyst is preferably an oxide containing at least one of cerium (Ce) and zirconium (Zr), more preferably a composite oxide containing cerium (Ce) and zirconium (Zr). In terms of oxygen occluding/releasing performance, an oxide containing cerium (Ce) is advantageous in the large capacity of occluding and releasing oxygen, while an oxide containing zirconium (Zr) is advantageous in the fast rate of occluding and releasing oxygen. Then, a composite oxide of cerium (Ce) and zirconium (Zr) is advantageous in both large capacity of occluding and releasing oxygen and fast rate of occluding and releasing oxygen.

Such oxides containing cerium and zirconium include, for example, a composite oxide (Zr—Ce—La—Nd—Ox) containing zirconium, cerium, lanthanum and neodymium, a composite oxide (Zr—Ce—Nd—Ox) containing zirconium, cerium and neodymium, a composite oxide (Zr—La—Ox) containing zirconium and lanthanum, and the like, but are not limited thereto. That is, any material known in the art that is capable of occluding and releasing oxygen can be used. For example, such materials include an oxide containing cerium and zirconium in which the cerium or the zirconium are partly substituted with an alkaline metal element, an alkaline earth metal element, a rare earth element or the like.

If the oxide capable of occluding and releasing oxygen of the first catalyst is a composite oxide containing cerium (Ce) and zirconium (Zr), the cerium content in the composite oxide is preferably equal to or greater than 5 mass % in cerium oxide ($CeO_2$) equivalent in terms of improving the CO conversion ratio and is preferably equal to or greater than 20 mass % in terms of further improving the CO conversion ratio. To be more specific, the cerium content in the composite oxide is preferably within the range from 5 mass % to 90 mass %, more preferably within the range from 20 mass % to 80 mass % in cerium oxide ($CeO_2$) equivalent. If the cerium content in the composite oxide exceeds 90 mass % in cerium oxide ($CeO_2$) equivalent, the effect of improving the CO conversion ratio may be attenuated.

The oxide of the general formula (1) of the first catalyst is preferably a perovskite oxide. Perovskite oxides are advantageous in good durability due to the crystal structure.

Noble metals that can be used for the second catalyst include platinum (Pt), palladium (Pd), rhodium (Rh) or the like. They may be used alone or in combination.

Second Embodiment

Figure 3:
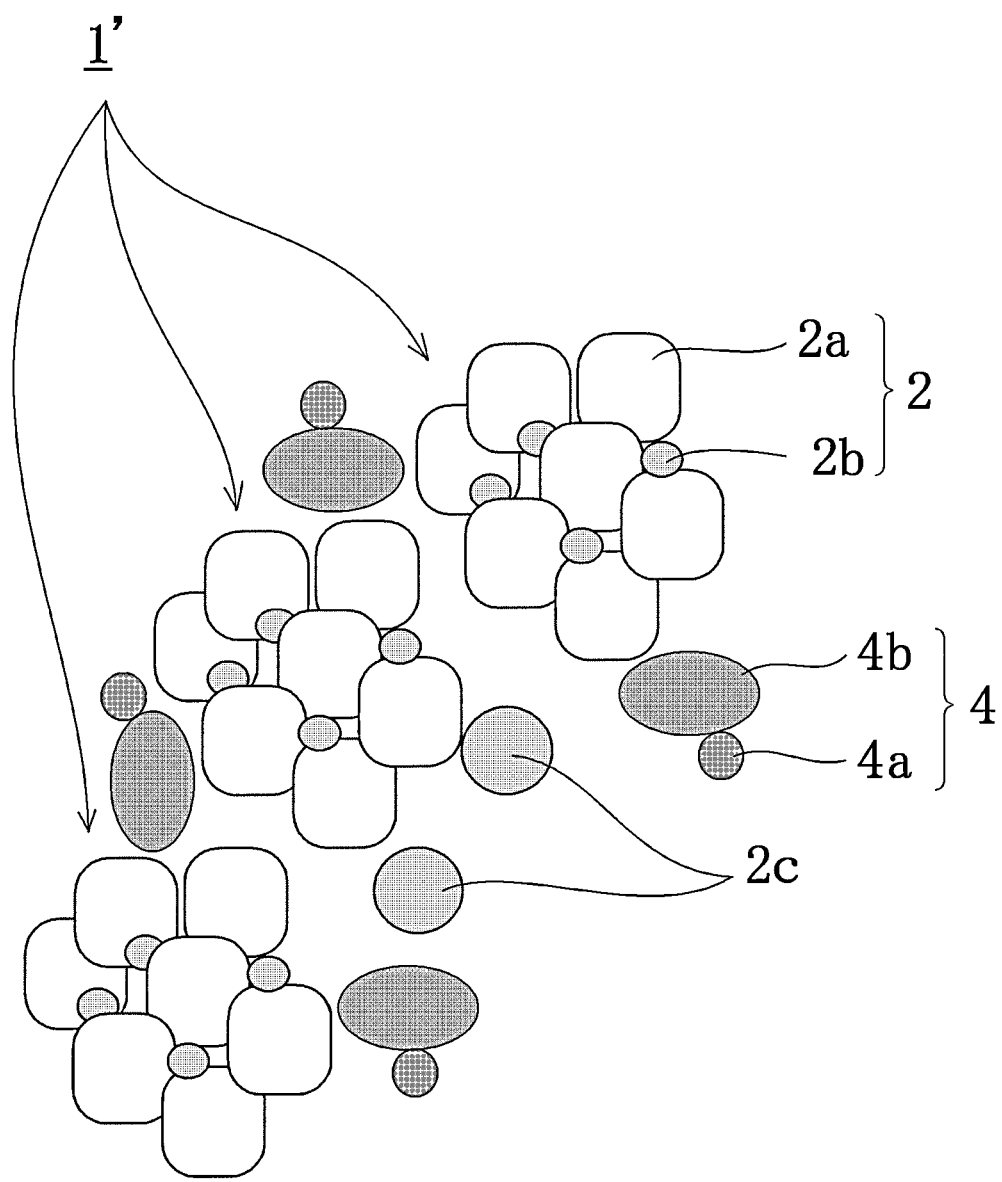
FIG. 3 schematically illustrates the structure of an exhaust gas purification catalyst according to a second embodiment.

FIG. 3 schematically illustrates the structure of an exhaust gas purification catalyst according to a second embodiment. The same reference signs are denoted to the same components as those described in the first embodiment, and the description thereof is omitted. As illustrated in the figure, the exhaust gas purification catalyst 1' of the second embodiment contains a first catalyst 2 in which an oxide 2b of the above general formula (1) is supported by an oxide 2a capable of occluding and releasing oxygen, and a second catalyst 4 in which a noble metal 4a is supported by a support 4b. The particle size of the oxide 2a is within the range from 1 to 50 nm, and the particle size of the oxide 2b is within the range from 1 to 30 nm. An oxide 2c of the general formula (1), which is illustrated in FIG. 3 for reference, is not supported by the oxide 2a capable of occluding and releasing oxygen. The particle size of the oxide 2c is typically greater than 50 nm.

Also with the above-described configuration, the exhaust gas purification catalyst exhibits high low-temperature activity. Further, the catalyst also exhibits high nitrogen oxides (NOx) conversion ratio at the high temperature range from 400° C. to 550° C.

Examples of the support of the second catalyst that supports the noble metal include, for example, aluminum oxide, zirconium oxide, cerium oxide and the like. However, it is not limited thereto, and the above-described oxides capable of occluding and releasing oxygen can also be used. They may be used alone or in suitable combination. Further, the particle size thereof is not particularly limited.

Third Embodiment

Next, the method for producing the exhaust gas purification catalyst according to an embodiment of the present invention will be described in detail with the above-described exhaust gas purification catalyst according to the embodiment of the present invention. However, the exhaust gas purification catalyst of the present invention is not limited to those produced by the production method.

The exhaust gas purification catalyst according to the first embodiment can be produced by, for example, the following production method.

First, as the oxide capable of occluding and releasing oxygen, aggregated particles of a fluorite oxide containing cerium and zirconium are prepared.

Further, a solution is prepared that contains lanthanum carboxylate and at least one metal carboxylate selected from a group consisting of barium carboxylate, strontium carboxylate, calcium carboxylate, iron carboxylate, cobalt carboxylate, nickel carboxylate and manganese carboxylate in the ratio that gives a desired composition of the oxide of the general formula (1).

Then, the obtained oxide capable of occluding and releasing oxygen is immersed in the obtained solution. In this step, the pressure of the atmosphere around the solution is reduced to a level lower than the atmospheric pressure by means of an aspirator or the like to remove the gas in micropores of the oxide capable of occluding and releasing oxygen so that the solution can be infiltrated and supported well.

Then, the oxide capable of occluding and releasing oxygen that is impregnated with the lanthanum carboxylate and the metal carboxylate is dried, is pre-calcined at approximately 400° C. and is calcined at approximately 700° C. The first catalyst can be thus obtained.

Thereafter, the first catalyst is immersed in a solution containing a salt of a noble metal such as platinum, palladium and rhodium to impregnate the first catalyst with the noble metal salt. It is then dried and is calcined at approximately 400° C. so that the second catalyst is supported by the first catalyst. The exhaust gas purification catalyst of the first embodiment can be thus obtained.

On the other hand, the exhaust gas purification catalyst of the second embodiment can be produced by, for example, the following production method.

First, as the oxide capable of occluding and releasing oxygen, aggregated particles of a fluorite oxide containing cerium and zirconium are prepared.

Further, a solution is prepared that contains lanthanum carboxylate and at least one metal carboxylate selected from a group consisting of barium carboxylate, strontium carboxylate, calcium carboxylate, iron carboxylate, cobalt carboxylate, nickel carboxylate and manganese carboxylate in the ratio that gives a desired composition of the oxide of the general formula (1).

Then, the obtained oxide capable of occluding and releasing oxygen is immersed in the obtained solution. In this step, the pressure of the atmosphere around the solution is reduced to a level lower than the atmospheric pressure by means of an aspirator or the like to remove the gas in micropores of the oxide capable of occluding and releasing oxygen, so that the solution can be infiltrated and supported well.

Then, the oxide capable of occluding and releasing oxygen that is impregnated with the lanthanum carboxylate and the metal carboxylate is dried, is pre-calcined at approximately 400° C. and is calcined at approximately 700° C. The first catalyst can be thus obtained.

Thereafter, the support such as aluminum oxide, zirconium oxide, cerium oxide and the above-described oxide capable of occluding and releasing oxygen is immersed in a solution containing a salt of a noble metal such as platinum, palladium and rhodium to impregnate the support with the noble metal salt. It is then dried and is calcined at approximately 400° C., and the second catalyst is mixed with the first catalyst. The exhaust gas purification catalyst of the second embodiment can be thus obtained.

In the production of these exhaust gas purification catalysts, if lanthanum nitrate and a metal nitrate are exclusively used, they are easily infiltrated into the micropores due to the very low viscosity. However, they easily move along with evaporation of the solution during the drying and the calcining. Accordingly, they are less supported. In contrast, if a lanthanum carboxylate and the metal carboxylate are used, they form metal complex salts. Since the metal complex salts are viscous, they can be infiltrated into the micropores by removing the gas in the micropores. However, in the drying and the calcining, the metal complex salts move less along with evaporation of the solution due to the viscosity. Accordingly, they are supported.

Carboxylic acids that can be used include those having one to four carboxyl group(s). Examples of such carboxylic acids include gluconic acid, malic acid, maleic acid, acetic acid, succinic acid, fumaric acid, propionic acid, methacrylic acid, acrylic acid, citric acid, tartaric acid, itaconic acid, formic acid, acetic acid, malonic acid and the like. Among them, lactic acid is preferably used.

Fourth Embodiment

Figure 4:
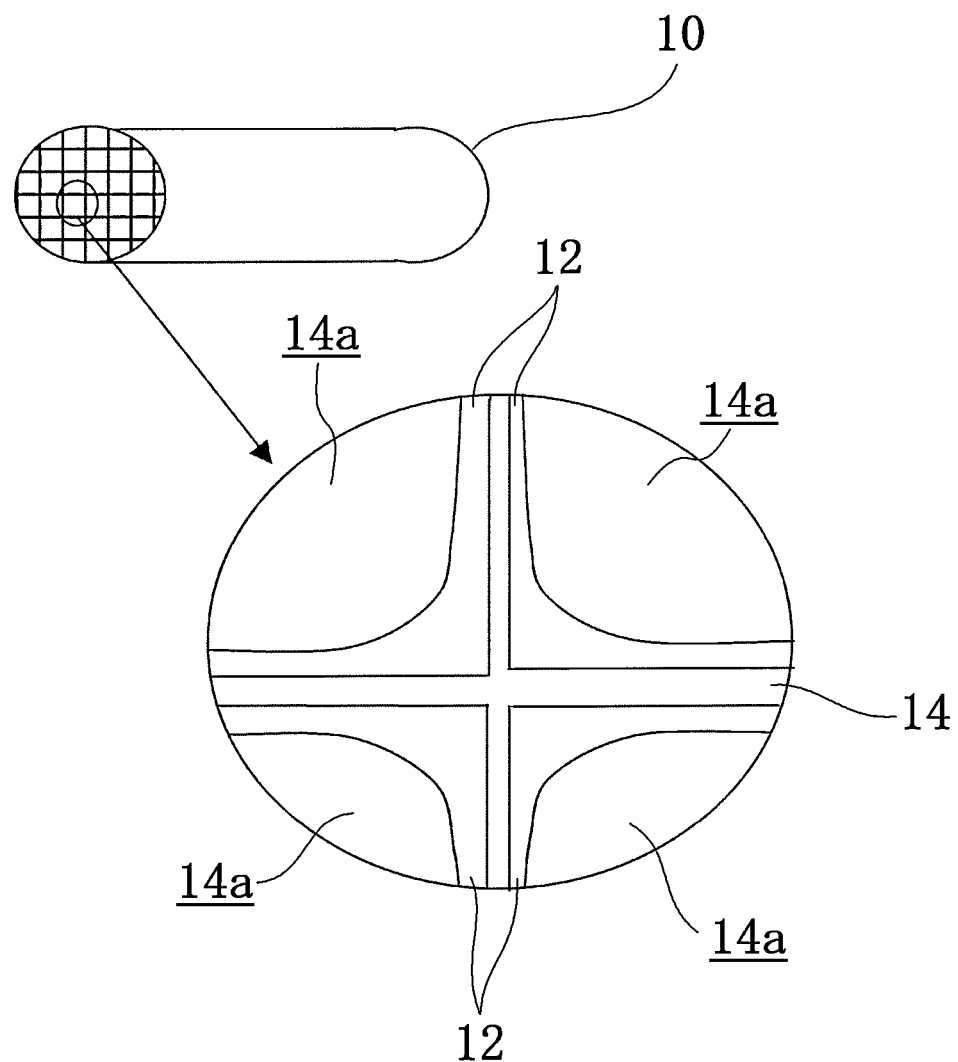
FIG. 4 schematically illustrates the structure of an exhaust gas purification monolith catalyst according to a fourth embodiment.

Next, an exhaust gas purification monolith catalyst according to an embodiment of the present invention will be described referring to the drawings. FIG. 4 schematically illustrates the structure of the exhaust gas purification monolith catalyst according to a fourth embodiment. As illustrated in the figure, the exhaust gas purification monolith catalyst 10 of the fourth embodiment includes a catalyst layer 12 that contains at least one of the exhaust gas purification catalysts of the first and second embodiments and is formed on exhaust gas channels 14a of a monolith support 14. Monolith supports that can be used include those made of a heat-resistant material, e.g. ceramics such as cordierite and metals such as ferritic stainless steel.

With this configuration, the exhaust gas purification monolith catalyst exhibits high NOx conversion performance at a high temperature range and also exhibits high low-temperature activity. In particular, it exhibits high purification performance even when exhaust gas flows fast.

EXAMPLES

Hereinafter, the present invention will be described in more detail with examples and comparative examples. However, the present invention is not intended to be limited to the examples.

Example 1

A first catalyst of the example was prepared by impregnating a Ce—Zr-based oxide (72 mass % $ZrO_2$, 21 mass % $CeO_2$, 5 mass % $Nd_2O_3$, 2 mass % $La_2O_3$) with a lactic acid solution containing lanthanum and a lactic acid solution containing iron and leaving it under reduced pressure for 1 hour, and thereafter calcining it in the air at 400° C. for 2 hours and at 700° C. for 5 hours. The mass ratio of $LaFeO_3$ to Ce—Zr-based oxide was $LaFeO_3$:Ce—Zr-based oxide=30:70. Further, the particle size was measured by observation under a scanning electron microscope (SEM).

Figure 5:
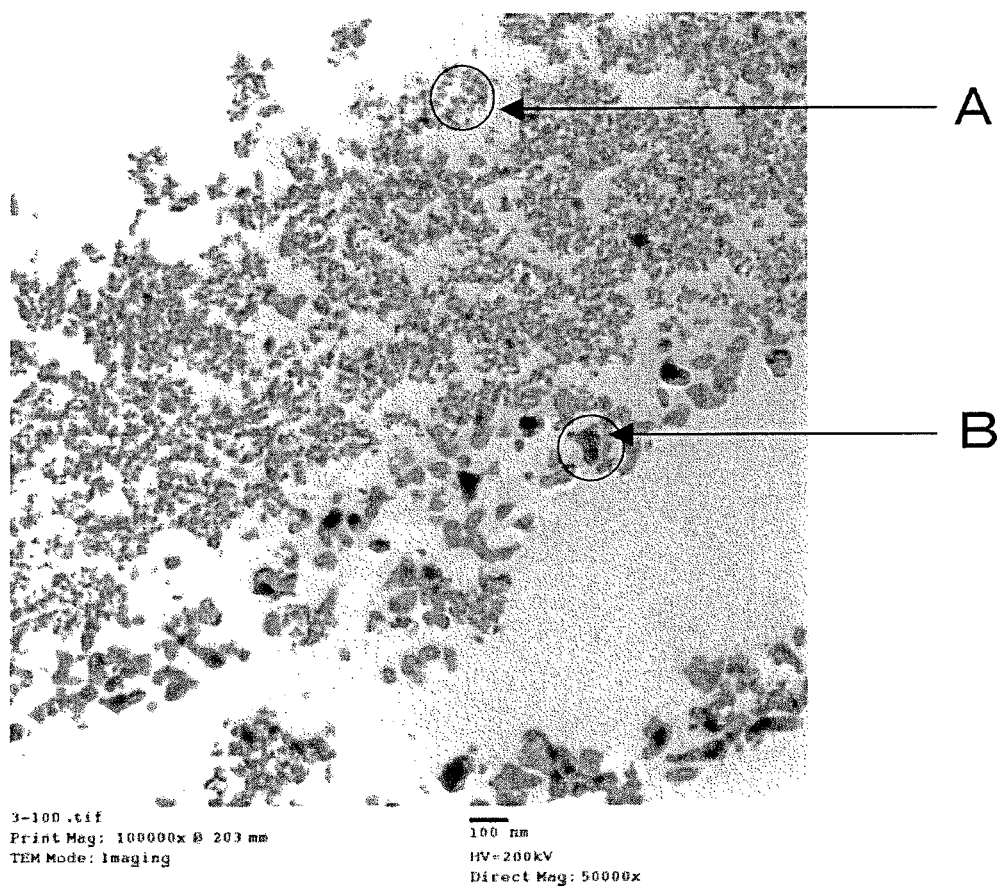
FIG. 5 is a transmission electron microscopic image of a first catalyst used in an exhaust gas purification catalyst of Example 1.
Figure 6:
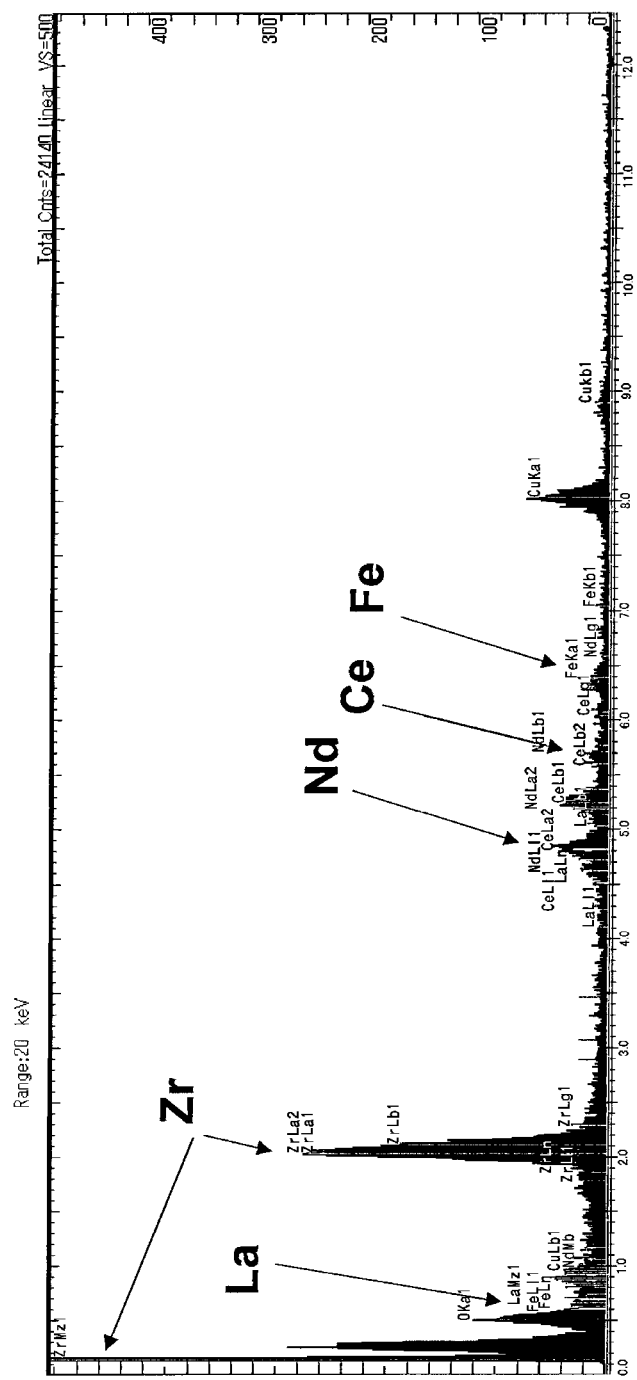
FIG. 6 illustrates a result of an energy dispersive X-ray spectroscopic analysis on Area A in FIG. 5.
Figure 7:
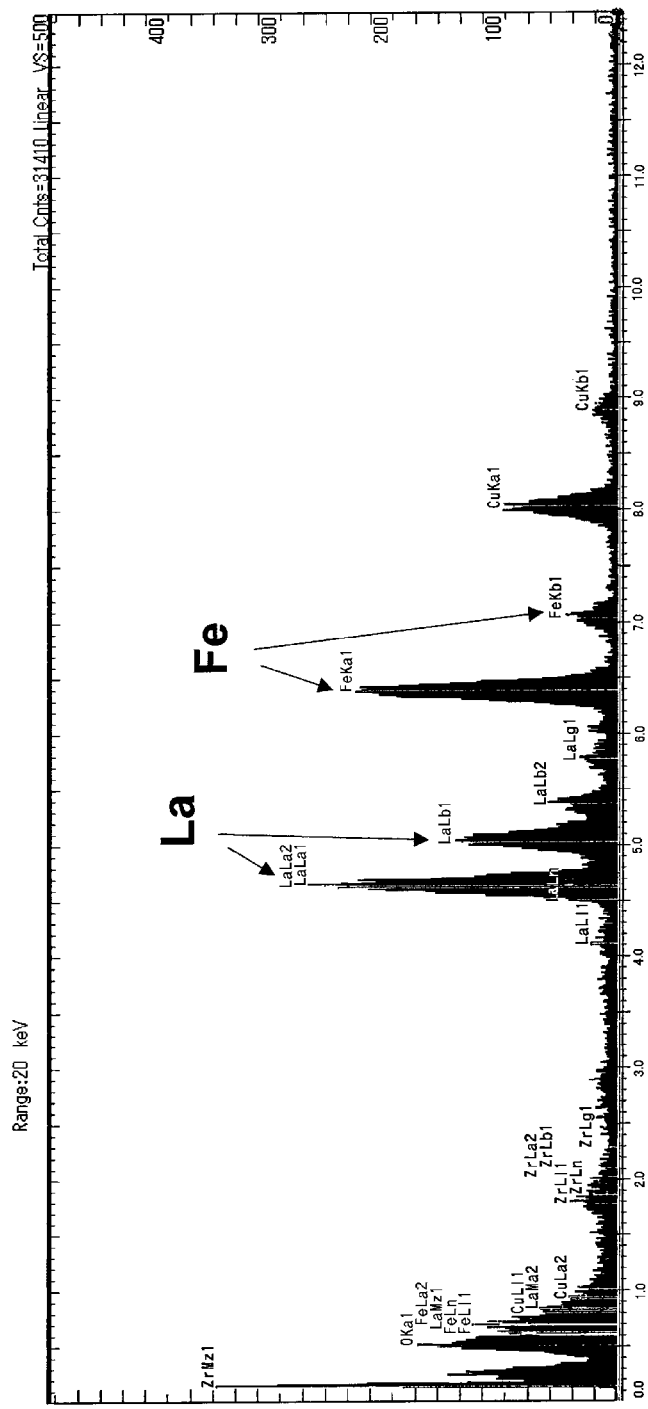
FIG. 7 illustrates a result of an energy dispersive X-ray spectroscopic analysis on Area B in FIG. 5.
Figure 8:
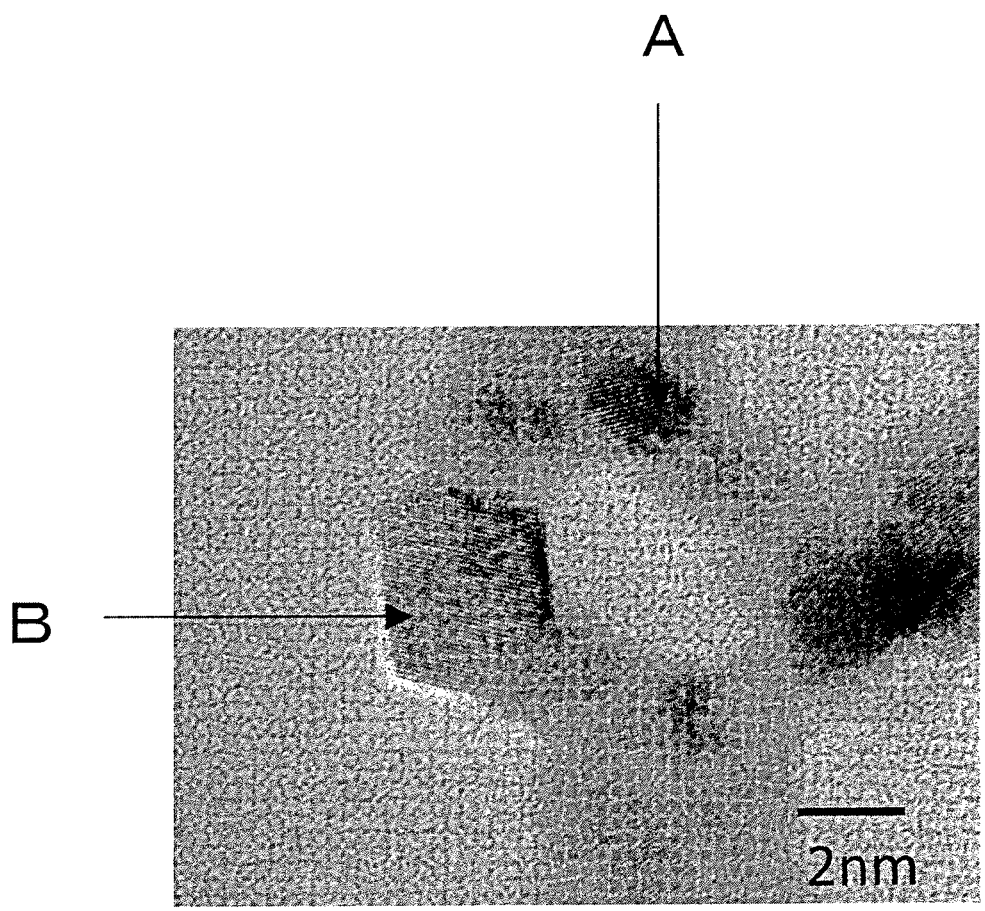
FIG. 8 is a transmission electron microscopic image of Area A in FIG. 5.

FIG. 5 is a transmission electron microscopic (TEM) image of the first catalyst used in the example. FIG. 6 illustrates a result of an energy dispersive X-ray analysis on Area A of FIG. 5. FIG. 7 is a result of an energy dispersive X-ray analysis on Area B of FIG. 5. FIG. 8 is a transmission electron microscopic image of Area A of FIG. 5.

As illustrated in FIG. 6, zirconium (Zr) and cerium (Ce) were mainly detected from the approximately 10-nm particles observed in Area A in an elemental analysis by means of an energy dispersive X-ray analysis (EDX). Further, lanthanum (La), neodymium (Nd) and iron (Fe) were also detected. In contrast, as illustrated in FIG. 7, iron (Fe) and lanthanum (La) were mainly detected from the particles over approximately 50 nm observed in Area B. Further, the period of the interference fringes observed in Area A and Area B of FIG. 8 and the result of an X-ray photoelectron spectroscopic (XPS) analysis, which was additionally performed, revealed the existence of fluorite Ce—Zr-based oxide particles and perovskite $LaFeO_3$ particles. Similar results were obtained also in the other examples.

The prepared first catalyst was impregnated with a palladium nitrate solution and was dried and then calcined at 400° C. for 1 hour so that the palladium content becomes 2.28 mass %. A second catalyst was thus supported by the first catalyst (hereinafter referred to as "Powder 1").

Into a ball mill, 70 g/L of the Powder 1, 31 g/L of zirconium oxide ($ZrO_2$) powder, 1.8 g/L of barium carbonate, 2.0 g/L of boemite alumina as a binder and nitric acid were charged, and they were grinded to an average particle size of 3 μm or less, so that a slurry was prepared. The prepared slurry was applied on a cordierite honeycomb support and was dried and then calcined at 400° C. The exhaust gas purification monolith catalyst of the example was thus obtained. The coating amount was 104.8 g/L. The palladium content in this state was approximately 1.6 g/L.

Example 2

A first catalyst of the example was prepared by impregnating a Ce—Zr-based oxide (72 mass % $ZrO_2$, 21 mass % $CeO_2$, 5 mass % $Nd_2O_3$, 2 mass % $La_2O_3$) with a lactic acid solution containing lanthanum and a lactic acid solution containing nickel, and leaving it under reduced pressure for 1 hour, and thereafter calcining the oxide in the air at 400° C. for 2 hours and at 700° C. for 5 hours. The mass ratio of $LaNiO_3$ to Ce—Zr-based oxide was $LaNiO_3$:Ce—Zr-based oxide=30:70. Further, the particle size was measured by observation under a scanning electron microscope (SEM).

The prepared first catalyst was impregnated with a palladium nitrate solution and was dried and then calcined at 400° C. for 1 hour so that the palladium content becomes 2.28 mass %. A second catalyst was thus supported by the first catalyst (hereinafter referred to as "Powder 2").

Into a ball mill, 70 g/L of Powder 2, 31 g/L of zirconium oxide ($ZrO_2$) powder, 1.8 g/L of barium carbonate, 2.0 g/L of boemite alumina as a binder and nitric acid were charged, and they were grinded to an average particle size of 3 μm or less, so that a slurry was prepared. The prepared slurry was applied on a cordierite honeycomb support and was dried then calcined at 400° C. The exhaust gas purification monolith catalyst of the example was thus obtained. The coating amount was 104.8 g/L. The palladium content in this state was approximately 1.6 g/L.

Example 3

A first catalyst of the example was prepared by impregnating a Ce—Zr-based oxide (72 mass % $ZrO_2$, 21 mass % $CeO_2$, 5 mass % $Nd_2O_3$, 2 mass % $La_2O_3$) with a lactic acid solution containing lanthanum and a lactic acid solution containing manganese and leaving it under reduced pressure for 1 hour, and thereafter calcining it in the air at 400° C. for 2 hours and at 700° C. for 5 hours. The mass ratio of $LaMnO_3$ to Ce—Zr-based oxide was $LaMnO_3$:Ce—Zr-based oxide=30:70. Further, the particle size was measured by observation under a scanning electron microscope (SEM).

The prepared first catalyst was impregnated with a palladium nitrate solution and was calcined at 400° C. for 1 hour after drying so that the palladium content becomes 2.28 mass %. A second catalyst was thus supported by the first catalyst (hereinafter referred to as "Powder 3").

Into a ball mill, 70 g/L of Powder 3, 31 g/L of zirconium oxide ($ZrO_2$) powder, 1.8 g/L of barium carbonate, 2.0 g/L of boemite alumina as a binder and nitric acid were charged, and they were grinded to an average particle size of 3 μm or less, so that a slurry was prepared. The prepared slurry was applied on a cordierite honeycomb support and was dried and then calcined at 400° C. The exhaust gas purification monolith catalyst of the example was thus obtained. The coating amount was 104.8 g/L. The palladium content in this state was approximately 1.6 g/L.

Comparative Example 1

An oxide of the Comparative example was prepared by impregnating a Ce—Zr-based oxide (72 mass % $ZrO_2$, 21 mass % $CeO_2$, 5 mass % $Nd_2O_3$, 2 mass % $La_2O_3$) with a nitric acid solution containing lanthanum and a nitric acid solution containing iron, drying it overnight at 150° C., further grinding it in a mortar, and thereafter calcining it in the air at 400° C. for 2 hours and at 700° C. for 5 hours. The mass ratio of $LaFeO_3$ to Ce—Zr-based oxide was $LaFeO_3$:Ce—Zr-based oxide=30:70. Further, the particle size was measured by observation under a scanning electron microscope (SEM). The particle size of the aggregates of the $LaFeO_3$ particles was within the range from 100 to 500 nm.

Figure 9:
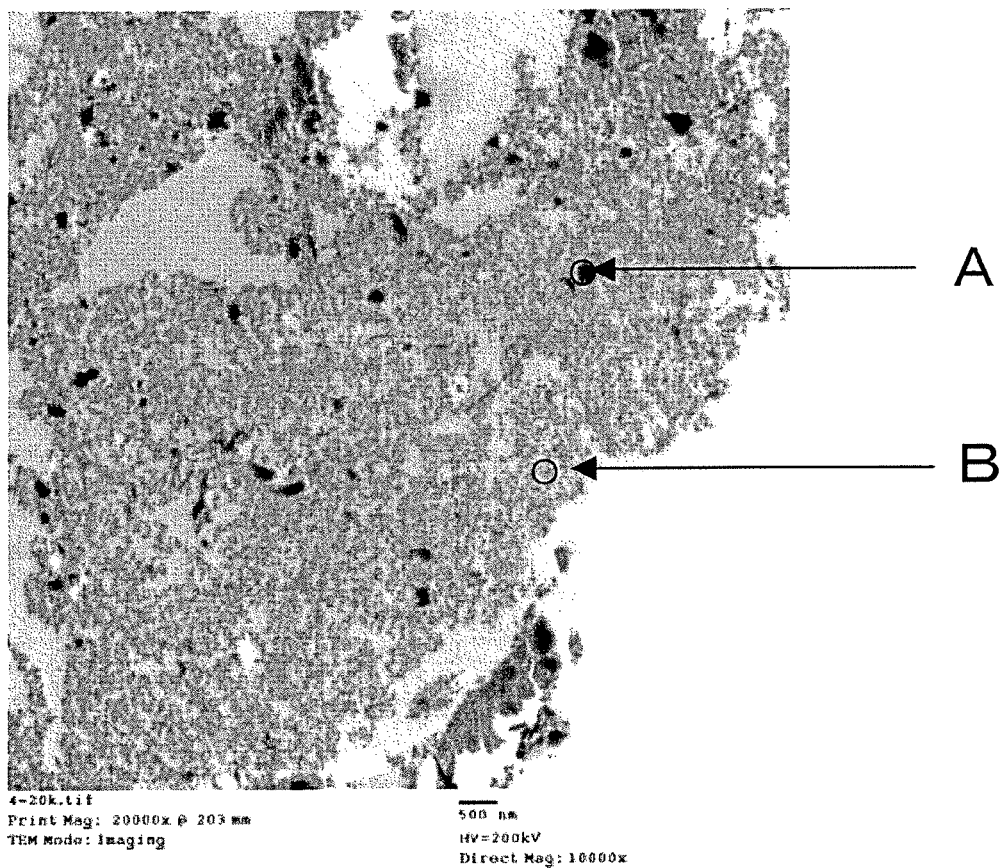
FIG. 9 is a transmission electron microscopic image of an oxide used in an exhaust gas purification catalyst of Comparative example 1.
Figure 10:
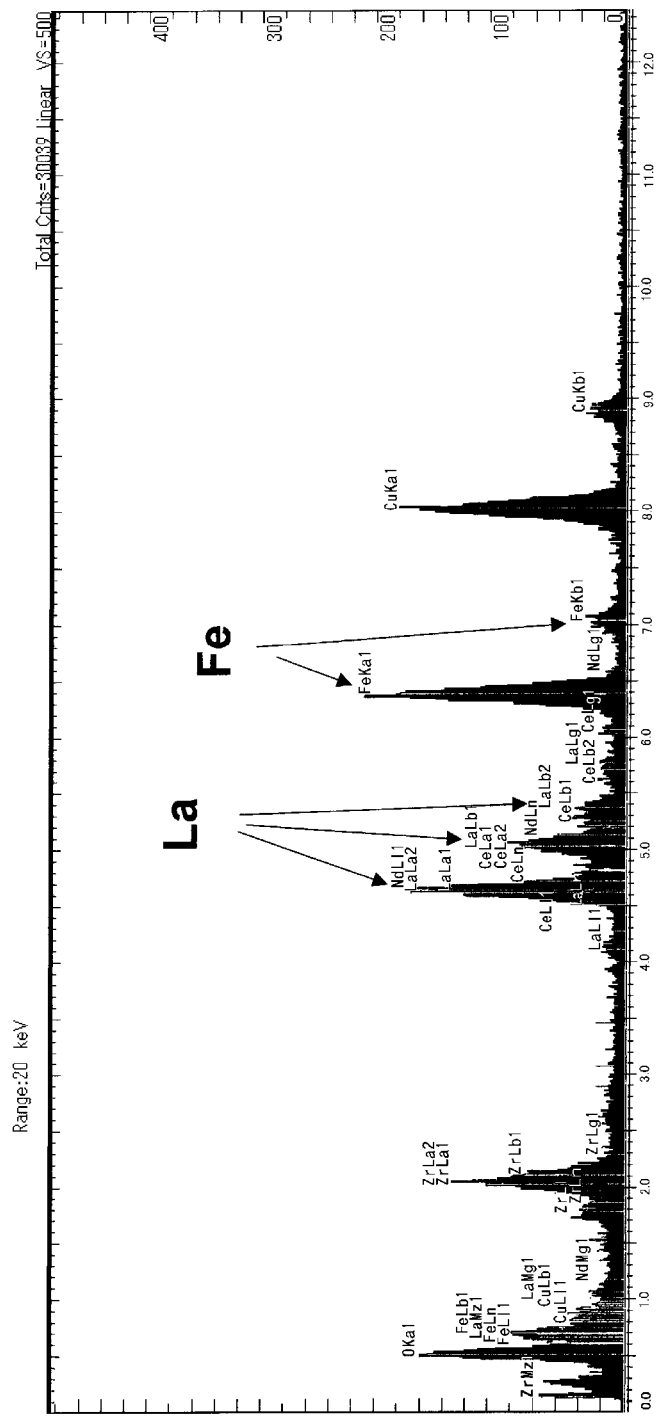
FIG. 10 illustrates a result of an energy dispersive X-ray spectroscopic analysis on Area A in FIG. 9.
Figure 11:
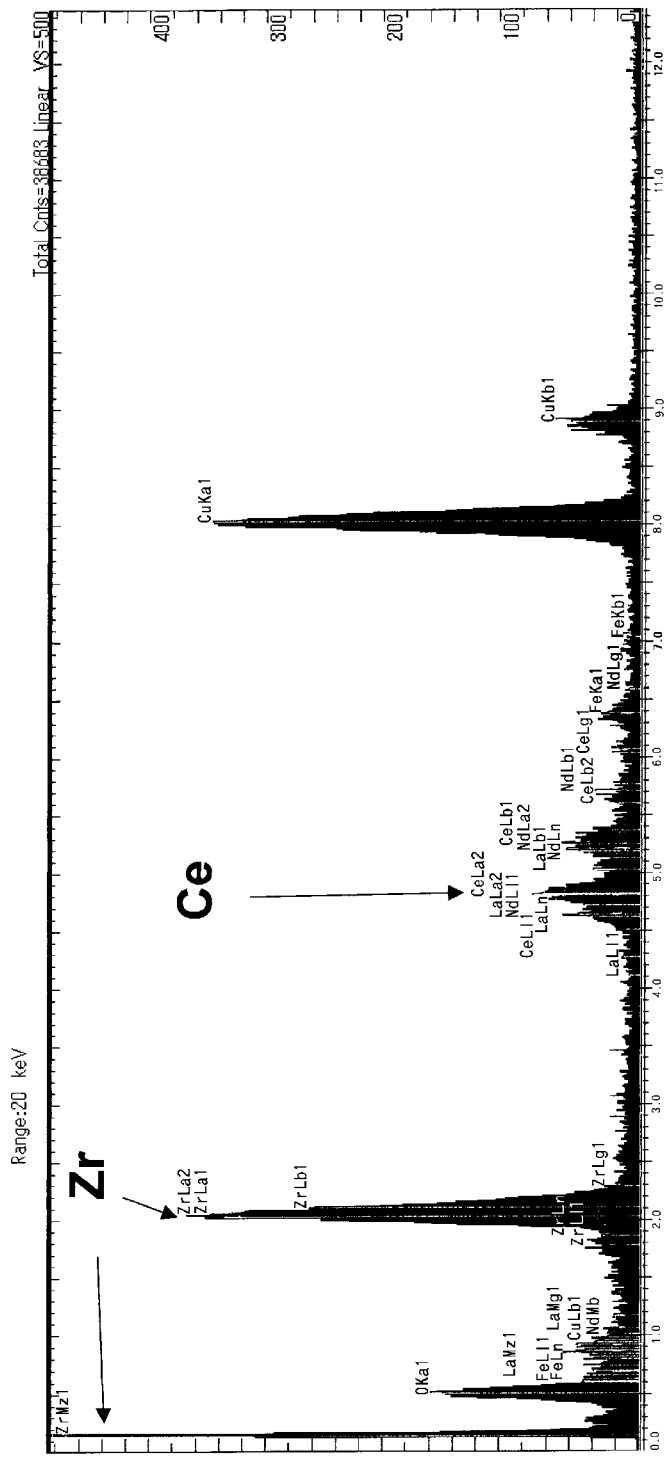
FIG. 11 illustrates a result of an energy dispersive X-ray spectroscopic analysis on Area B in FIG. 9.

FIG. 9 is a transmission electron microscopic (TEM) image of the oxide used in the Comparative example. FIG. 10 illustrates a result of an energy dispersive X-ray analysis on Area A of FIG. 9. FIG. 11 illustrates a result of an energy dispersive X-ray analysis on Area B of FIG. 9.

As illustrated in FIG. 10, iron (Fe) and lanthanum (La) were mainly detected from the aggregates observed in Area A in an elemental analysis by means of an energy dispersive X-ray analysis (EDX). In contrast, as illustrated in FIG. 11, zirconium (Zr) and cerium (Ce) were mainly detected from the matrix observed in Area B.

The prepared oxide was impregnated with a palladium nitrate solution and was dried and then calcined at 400° C. for 1 hour so that the palladium content became 2.28 mass %. A second catalyst was thus supported by the oxide (hereinafter referred to as "Powder 1'").

Into a ball mill, 70 g/L of Powder 1', 31 g/L of zirconium oxide ($ZrO_2$) powder, 1.8 g/L of barium carbonate, 2.0 g/L of boemite alumina as a binder and nitric acid were charged, and they were grinded to an average particle size of 3 μm or less, so that a slurry was prepared. The prepared slurry was applied on a cordierite honeycomb support and was dried and then calcined at 400° C. The exhaust gas purification monolith catalyst of the Comparative example was thus obtained. The coating amount was 104.8 g/L. The palladium content in this slate was approximately 1.6 g/L.

Example 4

A first catalyst used in the example was prepared by impregnating a Ce—Zr-based oxide (70 mass % $ZrO_2$, 20 mass % $CeO_2$, 10 mass % $Nd_2O_3$) with a lactic acid solution containing lanthanum and a lactic acid solution containing strontium, leaving it under reduced pressure for 1 hour, and thereafter calcining it in the air at 400° C. for 2 hours and at 700° C. for 5 hours (hereinafter referred to as "Powder 4-1"). The mass ratio of $La_{0.8}Sr_{0.2}FeO_3$ to Ce—Zr-based oxide was $La_{0.8}Sr_{0.2}FeO_3$:Ce—Zr-based oxide=6:94. Further, the particle size was measured by observation under a scanning electron microscope (SEM).

Further, a Ce—Zr-based oxide (70 mass % $ZrO_2$, 20 mass % $CeO_2$, 10 mass % $Nd_2O_3$) was impregnated with a palladium nitrate solution and was calcined at 400° C. for 1 hour after drying so that the palladium content became 0.106 mass %. A second catalyst used in the example (hereinafter referred to as "Powder 4-2") was thus prepared.

Into a ball mill, 134 g/L of Powder 4-1, 67 g/L of Powder 4-2, 16 g/L of boemite alumina as a binder and nitric acid were charged, and they were grinded to an average particle size of 3 μm or less so that a slurry was prepared. The prepared slurry was applied on a cordierite honeycomb support and was dried and then calcined at 400° C. The exhaust gas purification monolith catalyst of the example was thus obtained. The to coating amount was 216 g/L. The palladium content in this state was approximately 0.07 g/L.

Comparative Example 2

An oxide used in the Comparative example was prepared by impregnating a Ce—Zr-based oxide (70 mass % $ZrO_2$, 20 mass % $CeO_2$, 10 mass % $Nd_2O_3$) with a nitric acid solution containing lanthanum and a nitric acid solution containing strontium, drying it overnight at 150° C., further grinding it in a mortar, and thereafter calcining it in the air at 400° C. for 2 hours and at 700° C. for 5 hours (hereinafter referred to as "Powder 2'-1"). The mass ratio of $La_{0.8}Sr_{0.2}FeO_3$ to Ce—Zr-based oxide was $La_{0.8}Sr_{0.2}FeO_3$:Ce—Zr-based oxide=6:94. Further, the particle size was measured by observation under a scanning electron microscope (SEM).

Further, a Ce—Zr-based oxide (70 mass % $ZrO_2$, 20 mass % $CeO_2$, 10 mass % $Nd_2O_3$) was impregnated with a palladium nitrate solution and was dried and then calcined at 400° C. for 1 hour so that the palladium content became 0.106 mass %. A second catalyst used in the Comparative example (hereinafter referred to as "Powder 2'-2") was thus prepared.

Into a ball mill, 134 g/L of Powder 2'-1, 67 g/L of Powder 2'-2, 16 g/L of boemite alumina as a binder and nitric acid were charged, and they were grinded to an average particle size of 3 μm or less so that a slurry was prepared. The prepared slurry was applied on a cordierite honeycomb support and was dried and then calcined at 400° C. The exhaust gas purification monolith catalyst of the Comparative example was thus obtained. The coating amount was 216 g/L. The palladium content in this state was approximately 0.07 g/L.

Example 5

A first catalyst used in the example was prepared by impregnating a Ce—Zr-based oxide (70 mass % $ZrO_2$, 20 mass % $CeO_2$, 10 mass % $Nd_2O_3$) with a lactic acid solution containing lanthanum, a lactic acid solution containing strontium and a lactic acid solution containing iron, leaving it under reduced pressure for 1 hour, and thereafter calcining it in the air at 400° C. for 2 hours and at 700° C. for 5 hours (hereinafter referred to as "Powder 5-1"). The mass ratio of $La_{0.8}Sr_{0.2}FeO_3$ to Ce—Zr-based oxide was $La_{0.8}Sr_{0.2}FeO_3$:Ce—Zr-based oxide=6:94. Further, the particle size was measured by observation under a scanning electron microscope (SEM).

Further, a Ce—Zr-based oxide (75 mass % $ZrO_2$, 25 mass % $CeO_2$) was impregnated with a platinum dinitroamino nitrate solution and was dried and then calcined at 400° C. for 1 hour so that the platinum content became 0.216 mass %. A second catalyst used in the example (hereinafter referred to as "Powder 5-2") was thus prepared.

Into a ball mill, 134 g/L of Powder 5-1, 67 g/L of Powder 5-2, 16 g/L of boemite alumina as a binder and nitric acid were charged, and they were grinded to a particle size of 3 μm or less so that a slurry was prepared. The prepared slurry was applied on a cordierite honeycomb support and was dried and then calcined at 400° C. The exhaust gas purification monolith catalyst of the example was thus obtained. The coating amount was 216 g/L. The platinum content in this state was approximately 0.145 g/L.

Comparative Example 3

An oxide used in the Comparative example was prepared by impregnating a Ce—Zr-based oxide (70 mass % $ZrO_2$, 20 mass % $CeO_2$, 10 mass % $Nd_2O_3$) with a nitric acid solution containing lanthanum, a nitric acid solution containing strontium and a nitric acid solution containing iron, drying it overnight at 150° C., further grinding it in a mortar, and thereafter calcining it in the air at 400° C. for 2 hours and at 700° C. for 5 hours (hereinafter referred to as "Powder 3'-1"). The mass ratio of $La_{0.8}Sr_{0.2}FeO_3$ to Ce—Zr-based oxide was $La_{0.8}Sr_{0.2}FeO_3$:Ce—Zr-based oxide=6:94. Further, the particle size was measured by observation under a scanning electron microscope (SEM).

Further, a Ce—Zr-based oxide (75 mass % $ZrO_2$, 25 mass % $CeO_2$,) was impregnated with a platinum dinitrodiamino nitrate solution and was dried and then calcined at 400° C. for 1 hour so that the platinum content became 0.216 mass %. A second catalyst used in the Comparative example (hereinafter referred to as "Powder 3'-2") was thus prepared.

Into a ball mill, 134 g/L of Powder 3'-1, 67 g/L of Powder 3'-2, 16 g/L of boemite alumina as a binder and nitric acid were charged, and they were grinded to an average particle size of 3 μm or less so that a slurry was prepared. The prepared slurry was applied on a cordierite honeycomb support and was dried and then calcined at 400° C. The exhaust gas purification monolith catalyst of the Comparative example was thus obtained. The coating amount was 216 g/L. The platinum content in this state was approximately 0.145 g/L.

(Performance Evaluation)
(Bench Test Evaluation)

With respect to each of the above-described exhaust gas purification monolith catalysts, the concentrations of hydrocarbons (HC), carbon monoxide (CO) and nitrogen oxides (NOx) were measured with an exhaust gas analyzer (MEXA-7500D, HORIBA, Ltd.) in the following conditions. The obtained results are shown in Table 1 to Table 3 along with a part of the specification of each catalyst.

(Evaluation Conditions)
An engine produced by Nissan Motor Co., Ltd. was used.
Catalyst Volume: 119 $cm^3$
Gas flow rate: 60 $m^3$/h
Gas composition (stoichiometric): HC; approx. 2000 vol. ppmC, CO; approx. 0.54 vol. %, NO; approx. 1500 vol. ppm, $O_2$: approx. 0.56 vol. %, $CO_2$; 14.6 vol. %

TABLE 1

| | First Catalyst | | | |
|---|---|---|---|---|
| | (Oxide) Active Site | | (Oxide) Support | |
| | Composition | Size of Particles Existing on Ce—Zr-Based Composite Oxide (nm) | Composition | Particle Size (nm) |
| Example 1 | LaFeO3 | 2-10 | Ce—Zr—La—Nd—Ox | 10-30 |
| Example 2 | LaNiO3 | 3-10 | Ce—Zr—La—Nd—Ox | 10-30 |
| Example 3 | LaMnO3 | 3-10 | Ce—Zr—La—Nd—Ox | 10-30 |
| Comparative example 1 | LaFeO3 | N.D. | Ce—Zr—La—Nd—Ox | 10-30 |

| | Second Catalyst | | | Evaluation Results | | |
|---|---|---|---|---|---|---|
| | Noble Metal Active Site | | | Temperature at 50% HC Conversion Ratio (° C.) | Temperature at 50% CO Conversion Ratio (° C.) | Temperature at 50% NOx Conversion Ratio (° C.) |
| | Type | Content (g/L) | Support Type | | | |
| Example 1 | Pd | 1.6 | Active site listed in the left/Support | 274 | 271 | 277 |
| Example 2 | Pd | 1.6 | Active site listed in the left/Support | 277 | 274 | 276 |
| Example 3 | Pd | 1.6 | Active site listed in the left/Support | 282 | 280 | 281 |
| Comparative example 1 | Pd | 1.6 | Active site listed in the left/Support | 292 | 288 | 290 |

N.D.: non detect (= not detected)

TABLE 2

| | First Catalyst | | | |
|---|---|---|---|---|
| | (Oxide) Active Site | | (Oxide) Support | |
| | Composition | Size of Particles Existing on Ce—Zr-Based Composite Oxide (nm) | Composition | Particle Size (nm) |
| Example 4 | La0.8Sr0.2FeO3 | 5-10 | Ce—Zr—Nd—Ox | 5-30 |
| Comparative example 2 | La0.8Sr0.2FeO3 | N.D. | Ce—Zr—Nd—Ox | 5-30 |

| | Second Catalyst | | | Evaluation Results | | |
|---|---|---|---|---|---|---|
| | Noble Metal Active Site | | | Temperature at 50% HC Conversion Ratio (° C.) | Temperature at 50% CO Conversion Ratio (° C.) | Temperature at 50% NOx Conversion Ratio (° C.) |
| | Type | Content (g/L) | Support Type | | | |
| Example 4 | Pd | 0.07 | Ce—Zr—Nd—Ox | 335 | 328 | 353 |
| Comparative example 2 | Pd | 0.07 | Ce—Zr—Nd—Ox | 361 | 338 | 362 |

N.D.: non detect (= not detected)

TABLE 3

| | First Catalyst | | | | |
|---|---|---|---|---|---|
| | (Oxide) Active Site | | | (Oxide) Support | |
| | Composition | Size of Particles Existing on Ce—Zr-Based Composite Oxide (nm) | Composition | | Particle Size (nm) |
| Example 5 | La0.8Sr0.2FeO3 | 5-10 | Ce—Zr—Nd—Ox | | 5-30 |
| Comparative example 3 | La0.8Sr0.2FeO3 | N.D. | Ce—Zr—Nd—Ox | | 5-30 |

| | Second Catalyst | | | Evaluation Results | | |
|---|---|---|---|---|---|---|
| | Noble Metal Active Site | | | Temperature at 50% HC Conversion Ratio (° C.) | Temperature at 50% CO Conversion Ratio (° C.) | Temperature at 50% NOx Conversion Ratio (° C.) |
| | Type | Content (g/L) | Support Type | | | |
| Example 5 | Pt | 0.14 | Ce—Zr—Ox | 354 | 328 | 337 |
| Comparative example 3 | Pt | 0.14 | Ce—Zr—Ox | 367 | 336 | 366 |

N.D.: non detect (= not detected)

As can be seen from Table 1, Examples 1 to 3, which are within the scope of the present invention, are superior to Comparative example 1, which is out of the present invention, in low temperature activity. Further, as can be seen from Table 2, Example 4, which is within the scope of the present invention, is superior to Comparative example 2, which is out of the present invention, in low temperature activity. Further, as can be seen from Table 3, Example 5, which is within the scope of the present invention, is superior to Comparative example 3, which is out of the present invention, in low temperature activity.

With respect to Example 1, which is within the scope of the present invention, and Comparative example 1, which is out of the present invention, NOx conversion ratio was measured at a constant temperature (a temperature at the catalyst inlet of 480° C.) while changing the A/F between 14.0 to 15.2. The NOx conversion ratio was remarkably increased in a rich atmosphere where the A/F is within the range from 14.0 to 14.6. Specifically, while the NOx conversion ratio was equal to or greater than 60% and approximately 80% at the highest in Comparative example 1, the NOx conversion ratio was equal to or greater than 90% in Example 1.

(Bench Test Evaluation 2)

Figure 12:
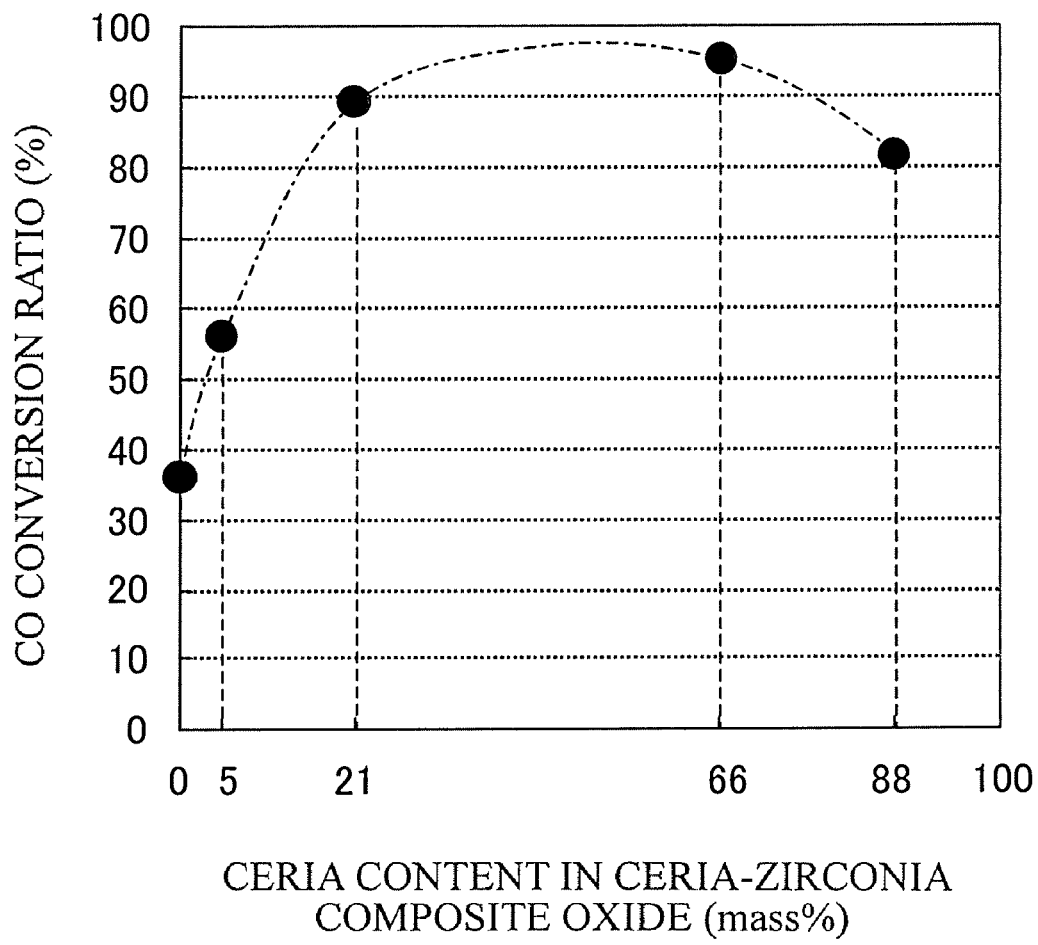
FIG. 12 is a graph illustrating the relationship between the ceria ratio in ceria-zirconia composite oxides and the CO conversion ratio.

The Ce—Zr-based oxide of Example 4 was changed to ceria-zirconia composite oxides with different ceria ratios, and the respective catalyst slurries were prepared from the ceria-zirconia composite oxides, boehmite alumina, nitric acid and ion-exchanged water. Further, using the slurries, the respective monolith catalysts were obtained. With respect to each monolith catalyst, the CO concentration was measured with an exhaust gas analyzer (MEXA-9100, HORIBA, Co., Ltd) in the following conditions. The CO conversion ratio was calculated based on the following expression (I). The obtained results are shown in FIG. 12.

(Evaluation Conditions)
An engine produced by Nissan Motor Co., Ltd. was used.
Catalyst coating amount: 268 g/L+DPR: 32 g/L
Gas flow rate: 60 m³/h
A/F fluctuation: ±0.2, 1.0 Hz Gas composition (stoichiometric): HC; approx. 2000 vol. ppmC, CO; approx. 0.54 vol. %, NO; approx. 1500 vol. ppm, $O_2$; approx. 0.56 vol. %, $CO_2$; 14.6 vol. %

$$\text{CO conversion ratio}(\%) = (CO_{in} - CO_{out})/CO_{in} \times 100 \tag{I}$$

Where $CO_{in}$ is the CO concentration measured by the exhaust gas analyzer of an exhaust gas that has not passed through the sample, and $CO_{out}$ is the CO concentration measured by the exhaust gas analyzer of an exhaust gas that has passed through the sample.

As can be seen from FIG. 12, it is preferred that the ceria ($CeO_2$) ratio in a ceria-zirconia composite oxide is preferably equal to or greater than 5 mass %, preferably equal to or greater than 20 mass %. In particular, the ratio is preferably within the range from 5 to 90 mass %, preferably within the range from 20 to 80 mass %.

REFERENCE SIGNS LIST 1, 1', 100 exhaust gas purification catalyst
2 first catalyst
2a oxide capable of occluding and releasing oxygen
2b, 2c oxide of general formula (1)
4 second catalyst
4a noble metal
4b support
10 exhaust gas purification monolith catalyst
12 catalyst layer
14 monolith support
14a exhaust channels

The invention claimed is:
1. An exhaust gas purification catalyst, comprising:
   a first catalyst in which an oxide of general formula (1) is supported by an oxide configured to occlude and release oxygen,

$$La_x M_{1-x} M'O_{3-\delta} \tag{1}$$

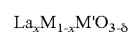

where La is lanthanum, M is at least one selected from a group consisting of barium (Ba), strontium (Sr) and calcium (Ca), M' is at least one selected from a group consisting of iron (Fe), cobalt (Co), nickel (Ni) and manganese (Mn), δ is the amount of oxygen defect, and x and δ satisfy $0<x\leq1$ and $0\leq\delta\leq1$; and a second catalyst containing a noble metal, wherein a particle size of the oxide configured to occlude and release oxygen is within a range from 1 to 50 nm, and a particle size of the oxide of the general formula (1) is within a range from 1 to 30 nm.

2. The exhaust gas purification catalyst according to claim 1, wherein the particle size of the oxide configured to occlude and release oxygen is within a range from 5 to 30 nm, and the particle size of the oxide of the general formula (1) is within a range from 3 to 10 nm.

3. The exhaust gas purification catalyst according to claim 2, wherein the oxide configured to occlude and release oxygen is an oxide that contains at least one of cerium and zirconium.

4. The exhaust gas purification catalyst according to claim 2, wherein the oxide configured to occlude and release oxygen is a composite oxide that contains cerium and zirconium.

5. The exhaust gas purification catalyst according to claim 4, wherein a cerium content in the composite oxide is equal to or greater than 5 mass % in cerium oxide ($CeO_2$) equivalent.

6. The exhaust gas purification catalyst according to claim 4, wherein a cerium content in the composite oxide is equal to or greater than 20 mass % in cerium oxide ($CeO_2$) equivalent.

7. The exhaust gas purification catalyst according to claim 1, wherein the oxide configured to occlude and release oxygen is an oxide that contains at least one of cerium and zirconium.

8. The exhaust gas purification catalyst according to claim 1, wherein the oxide configured to occlude and release oxygen is a composite oxide that contains cerium and zirconium.

9. The exhaust gas purification catalyst according to claim 8, wherein a cerium content in the composite oxide is equal to or greater than 5 mass % in cerium oxide ($CeO_2$) equivalent.

10. The exhaust gas purification catalyst according to claim 8, wherein a cerium content in the composite oxide is equal to or greater than 20 mass % in cerium oxide ($CeO_2$) equivalent.

11. An exhaust gas purification monolith catalyst, comprising:

a catalyst layer that contains an exhaust gas purification catalyst and is formed on an exhaust channel of a monolith support, wherein the exhaust gas purification catalyst contains: a first catalyst in which an oxide of general formula (1) is supported by an oxide configured to occlude and release oxygen, $$La_xM_{1-x}M'O_{3-\delta} \quad (1)$$

where La is lanthanum, M is at least one selected from a group consisting of barium (Ba), strontium (Sr) and calcium (Ca), M' is at least one selected from a group consisting of iron (Fe), cobalt (Co), nickel (Ni) and manganese (Mn), δ is the amount of oxygen defect, and x and δ satisfy $0<x\leq1$ and $0\leq\delta\leq1$; and a second catalyst containing a noble metal, wherein a particle size of the oxide configured to occlude and release oxygen is within a range from 1 to 50 nm, a particle size of the oxide of the general formula (1) is within a range from 1 to 30 nm.

12. A method for producing an exhaust gas purification catalyst in which the exhaust gas purification catalyst contains a first catalyst in which an oxide of general formula (1) is supported by an oxide configured to occlude and release oxygen, $$La_xM_{1-x}M'O_{3-\delta} \quad (1)$$

where La is lanthanum, M is at least one selected from a group consisting of barium (Ba), strontium (Sr) and calcium (Ca), M' is at least one selected from a group consisting of iron (Fe), cobalt (Co), nickel (Ni) and manganese (Mn), δ is the amount of oxygen defect, and x and δ satisfy $0<x\leq1$ and $0\leq\delta\leq1$; and a second catalyst containing a noble metal, wherein a particle size of the oxide configured to occlude and release oxygen is within a range from 1 to 50 nm, and a particle size of the oxide of the general formula (1) is within a range from 1 to 30 nm, the method comprising:

allowing a first catalyst to support a second catalyst by immersing the first catalyst in a solution that contains a noble metal salt so as to impregnate the first catalyst with the noble metal salt and calcining, wherein the first catalyst is prepared by immersing an oxide configured to occlude and release oxygen in a solution that contains a lanthanum carboxylate and at least one metal carboxylate selected from a group consisting of a barium carboxylate, a strontium carboxylate, a calcium carboxylate, an iron carboxylate, a cobalt carboxylate, a nickel carboxylate and a manganese carboxylate and reducing a pressure of an atmosphere around the solution to a level lower than an atmospheric pressure so as to impregnate the oxide configured to occlude and release oxygen with the lanthanum carboxylate and the metal carboxylate and calcining, or mixing a first catalyst with a second catalyst containing a noble metal salt, wherein the first catalyst is prepared by immersing an oxide configured to occlude and release oxygen in a solution that contains a lanthanum carboxylate and at least one metal carboxylate selected from a group consisting of a barium carboxylate, a strontium carboxylate, a calcium carboxylate, an iron carboxylate, a cobalt carboxylate, a nickel carboxylate and a manganese carboxylate and reducing a pressure of an atmosphere around the solution to a level lower than an atmospheric pressure so as to impregnate the oxide configured to occlude and release oxygen with the lanthanum carboxylate and the metal carboxylate and calcining.

* * * * *